United States Patent
Wang et al.

(10) Patent No.: US 11,704,284 B2
(45) Date of Patent: Jul. 18, 2023

(54) SUPPORTING STORAGE USING A MULTI-WRITER LOG-STRUCTURED FILE SYSTEM

(71) Applicant: VMware, Inc., Palo Alto, CA (US)

(72) Inventors: Wenguang Wang, Santa Clara, CA (US); Vamsi Gunturu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 289 days.

(21) Appl. No.: 16/847,543

(22) Filed: Apr. 13, 2020

(65) Prior Publication Data

US 2021/0318992 A1 Oct. 14, 2021

(51) Int. Cl.
| | |
|---|---|
| *G06F 16/17* | (2019.01) |
| *G06F 16/11* | (2019.01) |
| *G06F 16/182* | (2019.01) |
| *G06F 12/0873* | (2016.01) |
| *G06F 12/02* | (2006.01) |

(Continued)

(52) U.S. Cl.
CPC ...... *G06F 16/1734* (2019.01); *G06F 11/3034* (2013.01); *G06F 12/0246* (2013.01); *G06F 12/0873* (2013.01); *G06F 16/119* (2019.01); *G06F 16/1727* (2019.01); *G06F 16/1824* (2019.01); *G06F 16/215* (2019.01); *G06F 2212/7201* (2013.01)

(58) Field of Classification Search
CPC ............. G06F 16/1734; G06F 16/1727; G06F 16/1824; G06F 3/0631; G06F 3/067; G06F 11/3034; G06F 12/0246; G06F 12/0873; G06F 16/119; G06F 16/215; G06F 2212/7201; G06F 11/2056; G06F 11/3414; G06F 3/061; G06F 3/064; G06F 3/0659; G06F 3/0685; G06F 3/0689; G06F 16/1815

See application file for complete search history.

(56) References Cited

U.S. PATENT DOCUMENTS

| | | | | |
|---|---|---|---|---|
| 5,802,344 | A | * | 9/1998 | Menon ................. G06F 3/0607 711/165 |
| 6,032,216 | A | * | 2/2000 | Schmuck ............ G06F 16/1858 710/200 |

(Continued)

*Primary Examiner* — Tamara T Kyle
*Assistant Examiner* — Lana Alagic
(74) *Attorney, Agent, or Firm* — Barta, Jones & Foley, PLLC

(57) ABSTRACT

Solutions for supporting storage using a multi-writer log-structured file system (LFS) are disclosed that include receiving incoming data from an object of a plurality of objects that are configured to simultaneously write to the LFS from different nodes; based at least on receiving the incoming data, determining whether sufficient free segments are available in a local segment usage table (SUT) for writing the incoming data; based at least on determining that insufficient free segments are available, requesting allocation of new free segments; writing the incoming data to a log; acknowledging the writing to the object; determining whether the log has accumulated a full segment of data; based at least on determining that the log has accumulated a full segment of data, writing the full segment of data to a first segment of the free segments; and updating the local SUT to mark the first segment as no longer free.

20 Claims, 9 Drawing Sheets

(51) Int. Cl.
*G06F 11/30* (2006.01)
*G06F 16/215* (2019.01)

(56) References Cited

U.S. PATENT DOCUMENTS

| | | | | |
|---|---|---|---|---|
| 8,291,269 | B1* | 10/2012 | Ro | G06F 11/1446 |
| | | | | 707/823 |
| 10,534,768 | B2* | 1/2020 | Madhavarapu | G06F 16/273 |
| 11,080,262 | B1* | 8/2021 | Levandoski | G06F 16/2282 |
| 2012/0151175 | A1* | 6/2012 | Kim | G06F 12/0284 |
| | | | | 711/170 |
| 2013/0159364 | A1* | 6/2013 | Grider | G06F 16/1865 |
| | | | | 707/826 |
| 2013/0246672 | A1* | 9/2013 | Saputra | G06F 9/544 |
| | | | | 710/56 |
| 2016/0173599 | A1* | 6/2016 | Chablani | G06F 3/0643 |
| | | | | 709/217 |
| 2016/0371156 | A1* | 12/2016 | Merriman | G06F 11/1448 |
| 2019/0146675 | A1* | 5/2019 | Subramanian | G06F 3/061 |
| | | | | 711/170 |
| 2019/0155511 | A1* | 5/2019 | Tenner | G06F 9/5077 |
| 2021/0373761 | A1* | 12/2021 | Karr | G06F 3/0614 |

\* cited by examiner

SUPPORTING STORAGE USING A MULTI-WRITER LOG-STRUCTURED FILE SYSTEM

BACKGROUND

In some distributed arrangements, servers are distinguished as compute nodes and storage nodes. Although a storage node may attach a large number of storage devices (e.g., flash, solid state drives (SSDs), non-volatile memory express (NVMe), Persistent Memory (PMEM)) processing power may be limited beyond the ability to handle input/output (I/O) traffic. This may preclude the ability to execute some virtualization logic directly on a storage node, for example with arrangements using a multi-writer log-structured file system (LFS).

During data writes to storage devices, a phenomenon termed write amplification may occur, in which more data is actually written to the physical media than was sent for writing in the I/O. Write amplification is an inefficiency that produces unfavorable I/O delays, and may arise as a result of parity blocks that are used for error detection and correction (among other reasons). In general, the inefficiency may depend somewhat on the amount of data being written.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Solutions for supporting storage using a multi-writer log-structured file system (LFS) are disclosed that include receiving incoming data from an object of a plurality of objects, wherein the plurality of objects are configured to simultaneously write to the multi-writer LFS from different physical nodes; based at least on receiving the incoming data, determining whether sufficient free segments are available for writing the incoming data; based at least on determining that insufficient free segments are available for writing the incoming data, requesting allocation of new free segments; writing the incoming data to a log; acknowledging the writing to the object; determining whether the log has accumulated a full segment of data; based at least on determining that the log has accumulated a full segment of data, writing the full segment of data to a first segment of the free segments; and updating the local segment usage tables (SUT) to mark the first segment as no longer free. Some examples enable leveraging storage virtualization solutions for new configurations.

BRIEF DESCRIPTION OF THE DRAWINGS

The present description will be better understood from the following detailed description read in the light of the accompanying drawings, wherein.

DETAILED DESCRIPTION

Figure 1:
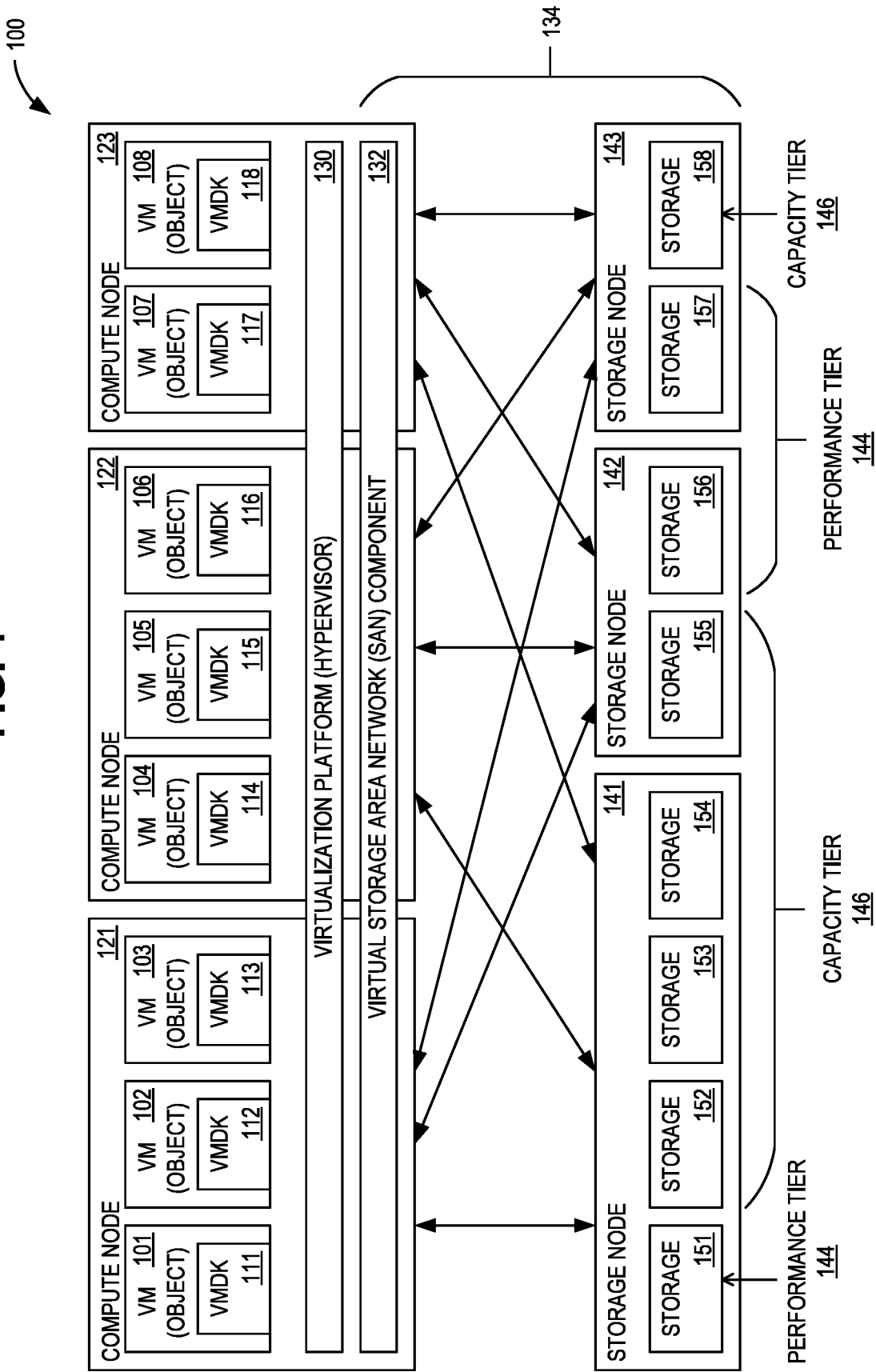
FIG. 1 illustrates an architecture that can advantageously support storage using a multi-writer global log-structured file system (LFS)

Virtualization software that provides software-defined storage (SDS), by pooling storage nodes across a cluster, creates a distributed, shared data store, for example a storage area network (SAN). A log-structured file system (LFS) takes advantage of larger memory sizes that lead to write-heavy input/output (I/O) by writing data and metadata to a circular buffer, called a log. Combining a SAN with an LFS, and making the SAN a single global object, permits the creation of a global multi-writer LFS, which may be written to concurrently from multiple objects (e.g., virtual machines (VMs)) on multiple compute nodes. The result is a (global) multi-writer LFS, as disclosed herein. Multiple writers are each able to write from different physical nodes to the same LFS, without frequent communication with each other, because they each write to their own free space. Their free space allocations are managed using their own local segment usage tables (SUTs). SUTs are used to track the space usage of storage segments.

Aspects of the disclosure improve the speed of computer storage (e.g., speeding data writing) with a multi-writer LFS by determining whether the log has accumulated a full segment of data (as defined by storage node hardware) and, based at least on determining that the log has accumulated a full segment of data, writing the full segment of data to a first segment of the free segments on the storage node hardware. Some aspects of the disclosure additionally leverage existing virtualization software, thereby increasing the efficiency of computing operations, by using SUTs. In general, storage devices are organized into full stripes spanning multiple nodes and each full stripe may be termed a segment. In some examples, a segment comprises an integer number of stripes.

Multiple SUTs are used: local SUTs, and a master SUT that is managed by a master SUT owner (e.g., the owner of the master SUT). Local SUTs track writer I/Os, and changes are merged into the master SUT. Aspects of the disclosure update a local SUT to mark segments as no longer free, and merge local SUT updates into the master SUT. By aggregating all of the updates, the master SUT is able to allocate free segments to the writers. Each compute node may have one or more writers (e.g., objects, or processes executing on the compute node that attempt to write data to the storage nodes), but since the master SUT allocates different free segments to different writers, the writers may operate in parallel without colliding. Different writers do not write to overlapping contents or ranges.

In some examples, a writer writes data to a data log on a performance tier (of the storage nodes) using 3-way mirror (or other number of mirrors that match the same kind of fault tolerance as the capacity tier protected by erasure coding), while waiting for a full segment worth of data being accumulated in the log. A performance tier may be a generally faster storage solution than a capacity tier. The capacity tier is the larger storage solution used as the final location for the data. Upon accumulating a full segment worth of data in the log, a full segment write is issued in an erasure-encoded manner. This process mitigates write amplification, which means fewer writes and therefore reduced usage of computing resources (e.g., storage, bandwidth, and processing).

In some examples, the master SUT owner is selected using a consensus mechanism. When the node acting as the master SUT owner is unable to continue performing as such, another node is selected to take over the task. In some examples, the master SUT owner also performs segment cleaning (garbage collection) by reading lightly used segments and writing them out to new segments to reclaim space. Before it marks the old segments as free, the segment cleaning process notifies other nodes of the list of segments being cleaned, which allows other nodes to invalidate their cached map entries.

In some examples, when an object (e.g., a writer or a virtual machine disk (VMDK)) moves from one compute node to another compute node, it first replays its part of the data log from its original compute node to reconstruct the mapping table state on the new compute node before accepting new I/Os. In some examples, a logical-to-physical map (e.g., addressing table) uses the object identifier (ID) (e.g., the ID of the object or VM) as the major key so that each object's map does not overlap with another object's map. In some examples, the object maps are represented as B-trees or Write-Optimized Trees and are protected by the metadata written out together with the log. In some examples, the metadata is stored in the performance tier with 3-way mirror and is not managed by the LFS.

Solutions for supporting storage using a multi-writer LFS are disclosed that include receiving incoming data from an object of a plurality of objects, wherein the plurality of objects are configured to simultaneously write to the multi-writer LFS from different physical nodes; based at least on receiving the incoming data, determining whether sufficient free segments are available in a local SUT for writing the incoming data; based at least on determining that insufficient free segments are available in a local SUT for writing the incoming data, requesting allocation of new free segments; writing the incoming data to a log; acknowledging the writing to the object; determining whether the log has accumulated a full segment of data; based at least on determining that the log has accumulated a full segment of data, writing the full segment of data to a first segment of the free segments; and updating a local SUT to mark the first segment as no longer free. Some examples enable leveraging storage virtualization solutions for new configurations.

FIG. 1 illustrates an architecture 100 that can advantageously support storage using a global multi-writer LFS. Additional details of architecture 100 are provided in FIGS. 2-3B, some exemplary data flows within architecture 100 are illustrated in FIG. 3C, and operations associated with architecture 100 are illustrated in flow charts of FIGS. 4-7. The components of architecture 100 will be briefly described in relation to FIGS. 1-3B, and their operations will be described in further detail in relation to FIGS. 3C-7. In some examples, various components of architecture 100, for example compute nodes 121, 122, and 123, and storage nodes 141, 142, and 143, are implemented using one or more computing devices 800 of FIG. 8.

Architecture 100 is comprised of a set of compute nodes 121-123 interconnected with each other and a set of storage nodes 141-143, although a different number of compute nodes and storage nodes may be used. Each compute node hosts multiple objects, which may be VMs, containers, applications, or any compute entity that can consume storage. For example, compute node 121 hosts objects 101, 102, and 103; compute node 122 hosts objects 104, 105, and 106; and compute node 123 hosts objects 107 and 108. In some examples a single compute node may host 50, 100, or a different number of objects. Each object uses a VMDK, for example VMDKs 111-118 for each of objects 101-108, respectively. Other implementations using different formats are also possible. A virtualization platform 130, which includes hypervisor functionality at one or more of compute nodes 121, 122, 123, manages objects 101-108.

Storage nodes 141-143 each include multiple physical storage components, which may include flash, solid state drives (SSDs), non-volatile memory express (NVMe), persistent memory (PMEM), and quad-level cell (QLC) storage solutions. For example storage node 141 has storage 151, 152, 153, and 154; storage node 142 has storage 155 and 156; and storage node 143 has storage 157 and 158. In some examples a single storage node may include a different number of physical storage components. In the described examples, storage nodes 141-143 are treated as a SAN with a single global object, enabling any of objects 101-108 to write to and read from any of storage 151-158 using a virtual SAN component 132. Virtual SAN component 132 executes in compute nodes 121-123. Virtual SAN component 132 and storage 151-158 together form a multi-writer LFS 134. Because multiple ones of objects 101-108 are able to write to multi-writer LFS 134 simultaneously, multi-writer LFS 134 is a multi-writer LFS. Simultaneous writes are possible, without collisions (conflicts), because each object (writer) uses its own local SUT that was assigned its own set of free spaces.

In some examples, storage 151-158 is just a bunch of disks (JBOD), and if implemented using flash drives, may be referred to as just a bunch of flash (JBOF). Thin-provisioning may be used, and in some examples, storage nodes 141-143 do not require significantly more processing power than is needed for handling I/O traffic. This arrangement may be less expensive than all of storage nodes 141-143 having the same processing capability as compute node 121. Using the disclosure, compute nodes 121-123 are able to operate with a wide range of storage options, including those with minimal processing capability.

In general, storage components may be categorized as performance tier or capacity tier. Performance tier storage is generally faster, at least for writing, than capacity tier storage. In some examples, performance tier storage has a latency approximately 10% that of capacity tier storage. Thus, when speed is important, and the amount of data is relatively small, write operations will be directed to performance tier storage. However, when the amount of data to be written is larger, capacity tier storage will be used. As illustrated, storage 151, 156, and 157 are collectively designated as a performance tier 144 (one per each of storage nodes 141, 142, and 143, for performance) and storage 152-155 and 158 are collectively designated as a capacity tier 146. In general, metadata will be written to performance tier 144 and bulk object data will be written to capacity tier 146. In some scenarios, as explained below, data intended for capacity tier 146 will be temporarily stored on performance tier 144, until a sufficient amount has accumulated such that writing operations to capacity tier 146 will be more efficient (e.g., by reducing write amplification).

Figure 2:
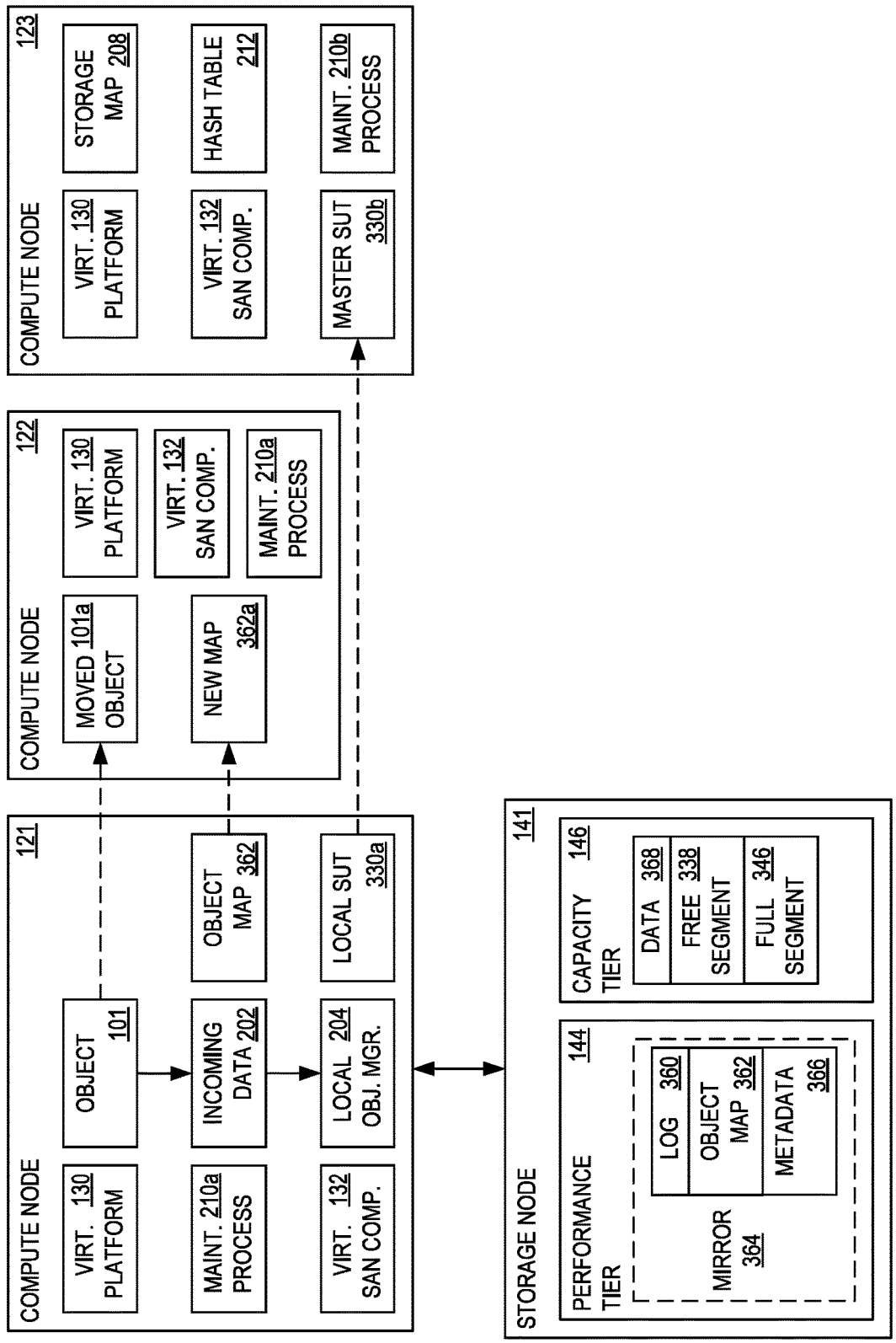
FIG. 2 illustrates additional details for the architecture of FIG. 1.

FIG. 2 illustrates additional details for the architecture of FIG. 1. Compute nodes 121-123 each include a manifestation of virtualization platform 130 and virtual SAN component 132. Virtualization platform 130 manages the generating, operations, and clean-up of object 101, including the moving of object 101 from compute node 121 to compute node 122, to become moved object 101 a. Virtual SAN component 132 permits object 101 to write incoming data 202 (incoming from object 101) to storage node 141, which houses performance tier 144 and at least a portion of capacity tier 146, by virtualizing the physical storage components of storage node 141 (and other storage nodes 142 and 143). Storage nodes 141-143 are described in further detail in relation to FIG. 3A.

Figures 3A, 3B:
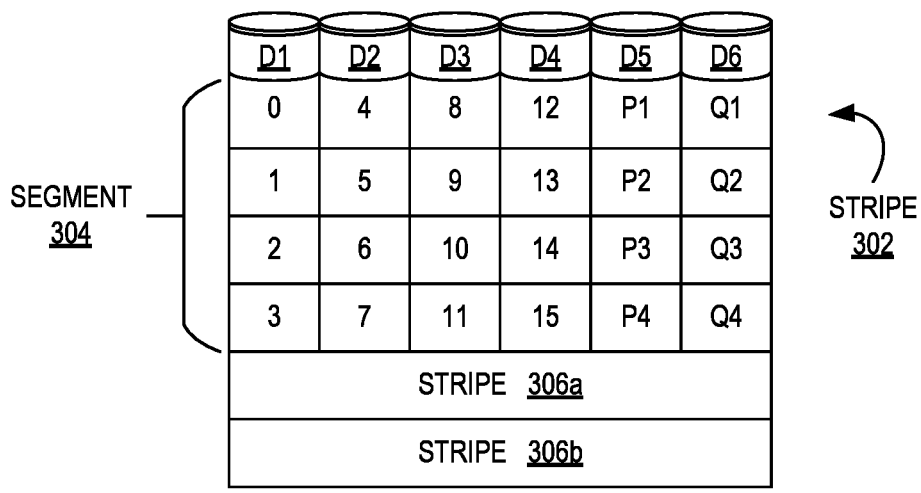
FIGS. 3A and 3B illustrate further details for various components of FIGS. 1 and 2.
Figure 3C:
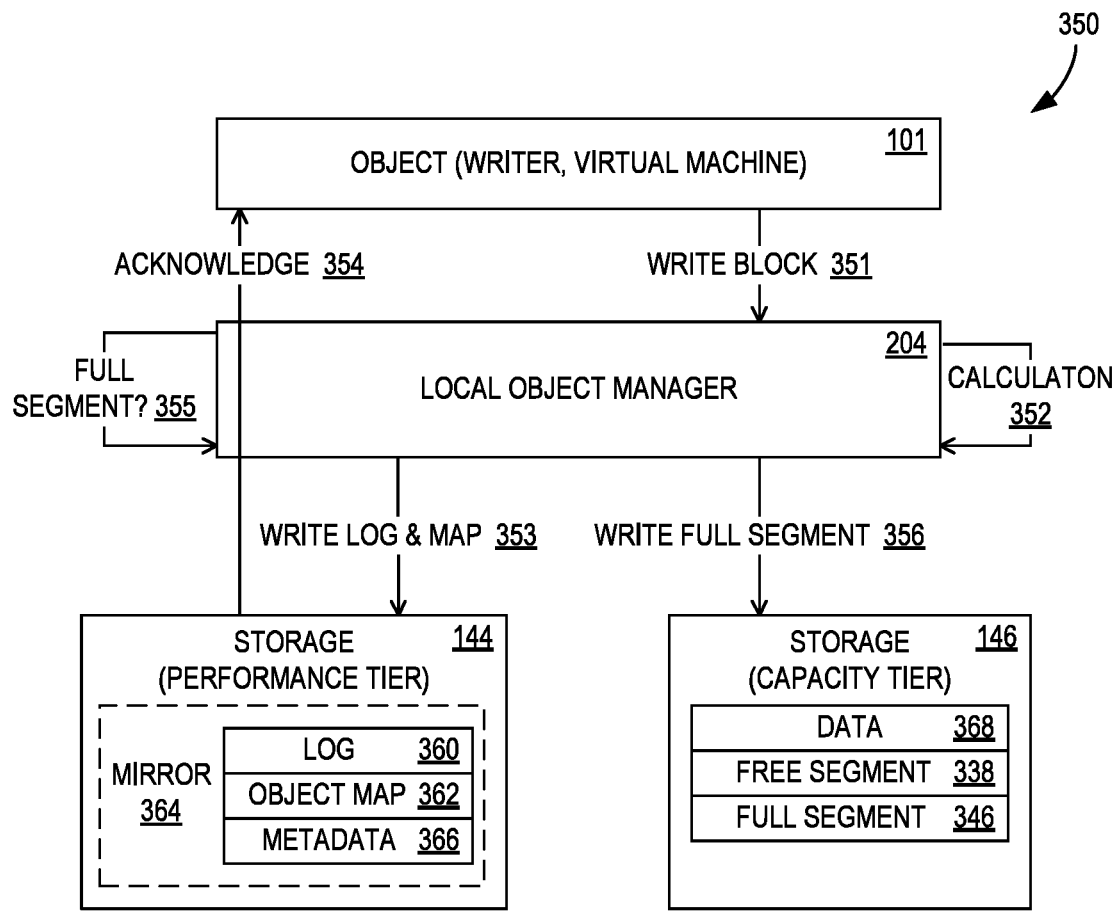
FIG. 3C illustrates exemplary messaging among various components of FIGS. 1 and 2.

Turning briefly to FIG. 3A, a set of disks D1, D2, D3, D4, D5, and D6 are shown in a data striping arrangement 300. Data striping divides or segments logically sequential data, such as blocks of files, so that consecutive portions are stored on different physical storage devices. By spreading portions across multiple devices which can be accessed concurrently, total data throughput is increased. This also balances I/O load across an array of disks. Striping is used across disk drives in redundant array of independent disks (RAID) storage, for example RAID-5/6. RAID configurations may employ the techniques of striping, mirroring, and/or parity to create large reliable data stores from multiple general-purpose storage devices. RAID-5 consists of block-level striping with distributed parity. Upon failure of a single storage device, subsequent reads can be calculated using the distributed parity as an error correction attempt. RAID 6 extends RAID 5 by adding a second parity block. Arrangement 300 may thus be viewed as a RAID-6 arrangement with four data disks (D1-D4) and two parity disks (D5 and D6). This is a 4+2 configuration. Other configurations are possible, such as 17+3, 20+2, 12+4, 15+7, and 100+2.

A stripe is a set of blocks, as shown in the rectangle in FIG. 3A, for example as stripe 302. Four columns are data blocks, based on the number of data disks, D1-D4, and two of the columns are parities, indicated as P1 and Q1 in the first row, based on the number of parity disks, D5 and D6. Thus, in some examples, the stripe size is defined by the available storage size. In some examples, blocks are each 4 kilobytes (KB). In some examples, QLC requires a 128 KB write. With 128 KB and six disks, the stripe size is 768 KB (128 KB×6=768 KB), of which 512 KB is data, and 256 KB is parity. With 32 disks, the stripe size is 4 megabytes (MB). A segment 304 is shown as including 4 blocks from each of D1-D4, numbered 0 through 15, plus parity blocks designated with P1-P4 and Q1-Q4. A segment is the unit of segment cleaning, and in some examples, is aligned on stripe boundaries. In some examples, a segment is a stripe. In some examples, a segment is an integer number of stripes. Additional stripes 306 a and 306 b are shown below segment 304.

When a block is being written, write amplification occurs. In general, there are three types of updates: small partial stripe writes, large partial stripe writes, and full stripe writes. With small partial stripe writes, old content of the to-be-written blocks and parity blocks are read to calculate the new parity blocks, and new blocks and parity blocks are written. With large partial stripe writes, the untouched blocks in the stripe of the content are read to calculate the new parity blocks, and new blocks and new parity blocks are written. With full stripe writes, new parity blocks are calculated based on new blocks, and the full stripe is written. When writing only full stripes or segments, the read-modify-write penalty can be avoided, reducing write amplification and increasing efficiency and speed.

Returning now to FIG. 2, in some examples, a local object manager 204 treats the virtualization layer of virtual SAN component 132 as a physical layer (e.g., by adding its own logical-to-physical map, checksum, caching, and free space management, onto it and exposing its logical address space). In some examples, local object manager 204 manages the updating of local SUT 330a on compute node 121. Either local object manager 204 or virtual SAN component 132 (or another component) manages merging updates to local SUT 330a into master SUT 330b on compute node 123. Compute node 123 is the owner of master SUT 330b, that is, compute node 123 is the master SUT owner. Both compute nodes 122 and 123 may also have their own local SUTs, and changes to those local SUTs will also be merged into master SUT 330b. Because each object (e.g., VM, deduplication process, segment cleaning process, or another writer) goes through its own version of local SUT 330a, which is allocated its own free space according to master SUT 330b, there will be no conflicts. Local SUT 330a and master SUT 330b are described in further detail in relation to FIG. 3B.

Turning briefly to FIG. 3B, an exemplary SUT 330 is illustrated. SUT 330 may represent either local SUT 330a or master SUT 330b. SUT 330 is used to track the space usage of each segment in a storage arrangement, such as arrangement 300. In some examples, SUT 330 is initialized with values pulled from a storage node (e.g., storage node 141) during bootstrap, for access by the virtualization platform 130 (e.g., into the hypervisor functionality). In FIG. 3B, segments are illustrated as rows of matrix 332, and blocks with live data (live blocks) are indicated with shading. Non-shaded blocks are either empty or have contained data but are marked to indicate that the data has been deleted. Each segment has an index, indicated in segment index column 334. The number of blocks available for writing are indicated in free count column 336. The number of blocks available for writing decrements for the segment being written to, with each write operation. For example, a free segment, such as free segment 338, has a free count equal to the total number of blocks in the segment (in the illustrated example, 16), whereas a full segment, such as full segment 346 has a free count of zero. In some examples, a live block count is used, in which a value of zero indicates a free segment rather than a full segment. In some examples, SUT 330 forms a doubly-linked list. A doubly linked list is a linked data structure having a set of sequentially linked records.

SUT 330 is used to keep track of space usage and age in each segment. This is needed for segment cleaning, and also to identify free segments, such as free segments 338, 338a, and 338b, to allocate to individual writers (e.g., objects 101-108, deduplication processes, and segment cleaning processes). If a free count indicates that no blocks in a segment contain live data, that block can be written to without any need to move any blocks. Any prior-written data in that segment has either already been moved or marked as deleted and thus may be over-written without penalty. This avoids read operations that would be needed if data in that segment needed to be moved elsewhere for preservation.

As indicated, segments 342a, 342b, and 342c are mostly empty, and are thus lightly-used segments. A segment cleaning process may target these live blocks for moving to a free segment. Segment 344 is indicated as a heavily-used segment, and thus may be passed over for segment cleaning (garbage collection).

Returning now to FIG. 2, although local SUT 330a is illustrated as being stored within compute node, in some examples, local SUT 330a may be held elsewhere. In some examples, master SUT 330b is managed by a single node in the cluster (e.g., compute node 123, the master SUT owner), whose job is handing out free segments to all writers.

Allocation of free segments to writers is indicated in master SUT 330b, with each writer being allocated different free segments. For example, when object 101 needs more segments, master SUT 330b finds new segments (e.g., free segment 338) and assigns them to object 101. Different writers receive different, non-overlapping assignments of free segments. Because each writer knows where to write, and writes to different free segments, all writers may operate in parallel.

Object map 362 is used for tracking the location of data, for example if incoming data 202 is stored in log 360 in performance tier 144. Other metadata 366 is also stored in performance tier 144, and data in performance tier 144 may be mirrored with mirror 364. When incoming data 202 is moved to data 368 in capacity tier 146, for example as part of a write of a full segment, incoming data 202 may be removed from object map 362. In some examples, object map 362 comprises a B-tree or a log-structured merge-tree (LSM tree) or some other indexing structure such as write-optimized tree, W-tree. A B-tree is a self-balancing tree data structure that maintains sorted data and allows searches, sequential access, insertions, and deletions in logarithmic time. An LSM tree or W-tree is a data structure with performance characteristics that make it attractive for providing indexed access to files with high insert volume, such as transactional log data. Each writer has its own object map. A logical-to-physical storage map 208 uses an object ID as a major key, thereby preventing overlap of the object maps of different writers.

When object 101 moves from compute node 121 to compute node 122, it becomes moved object 101a. Log 360 is replayed, at least the portion pertaining to object 101, to reconstruct object map 362 as a new object map 362a for the new node. In some examples, object map 362 is stored on compute node 121 and new object map 362a is stored on compute node 122. In some examples, object map 362 and new object map 362a are stored on performance tier 144 or elsewhere.

A local maintenance process 210a on compute nodes 121 and 122 (and also possibly on compute node 123) may be a local deduplication process and/or a local segment cleaning process. A global maintenance process 210b on compute node 123 may be a global deduplication process and/or a global segment cleaning process. A hash table 212 is used by a deduplication process, whether local or global.

FIG. 3C illustrates exemplary messaging 350 among various components of FIGS. 1 and 2. Object 101 writes one or more blocks, but less than a full segment in message 351, local object manager 204 receiving incoming data 202 (as message 351) from object 101. Local object manager 204 calculates a checksum or a hash of incoming data 202 as message 352. Local object manager 204 writes incoming data 202 to log 360 and updates object map 362 (which may be local to compute node 121, in some examples), via message 353. That is, based at least on writing incoming data 202 to log 360, local object manager 204 updates object map 362 to indicate the writing of incoming data 202 to log 360. Log 360 and other metadata 366 are mirrored on performance tier 144. In some examples, updating object map 362 comprises mirroring metadata for object map 362. In some examples, mirroring metadata for object map 362 comprises mirroring metadata for object map 362 on performance tier 144. In some examples, mirroring metadata for object map 362 comprises using a three-way mirror. An acknowledgement 354, acknowledging the completion of the write (to log 360) is sent to object 101.

Local object manager 204 determines whether log 360 has accumulated a full segment of data, such as enough to fill free segment 338, as message 355. Based at least on determining that log 360 has accumulated a full segment of data, local object manager 204 writes the full segment of data to a first segment (e.g., free segment 338) of the free segments which have been allocated to object 101 (or allocated to local object manager 204), as message 356. In some examples, data can be first compressed before being written. Log 360 and object map 362 are purged of references to incoming data 202. This is accomplished by, based at least on writing the full segment of data, updating object map 362 to indicate the writing of the full segment of data.

Figure 4:
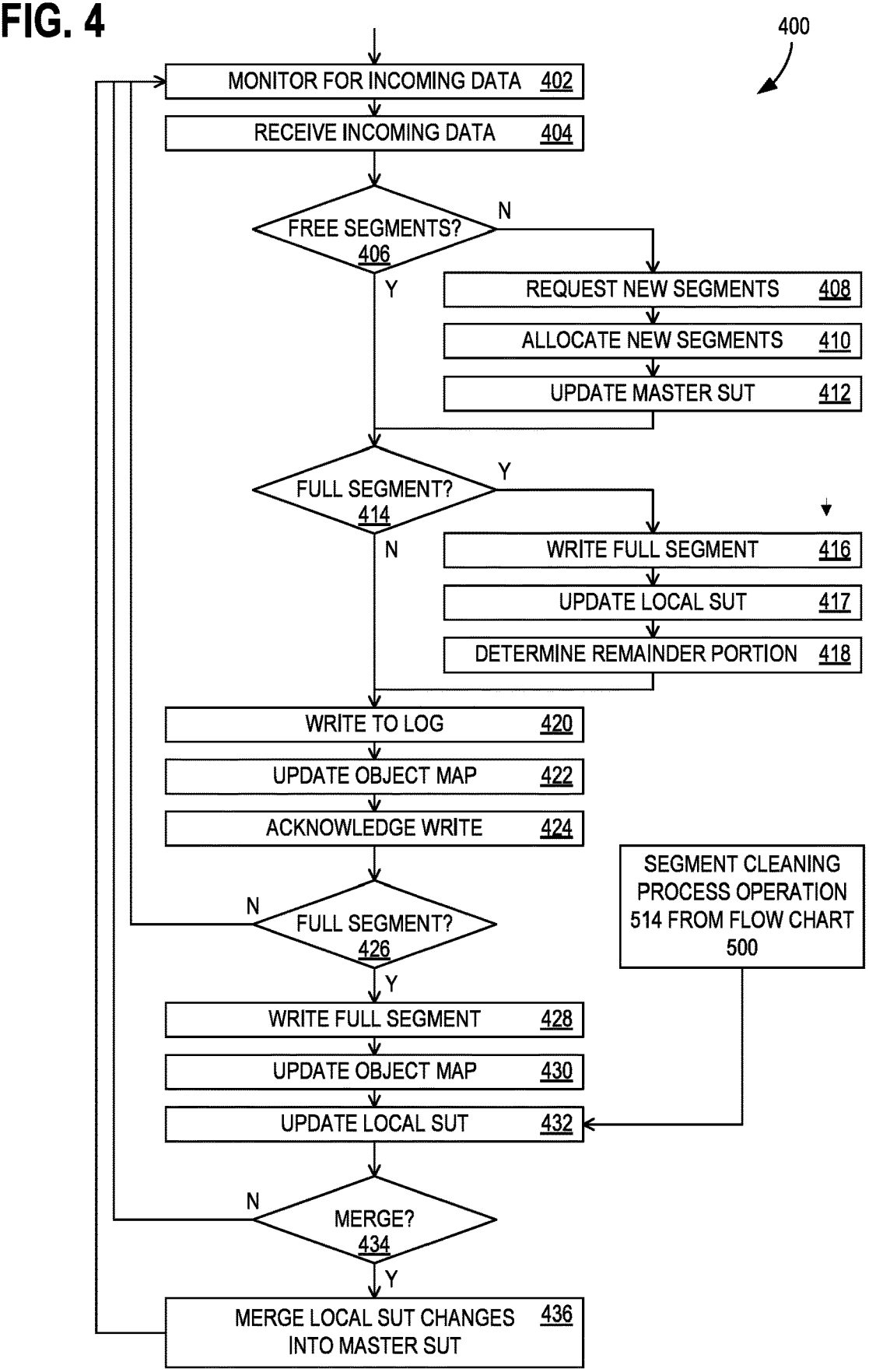
FIG. 4 illustrates a flow chart of exemplary operations associated with the architecture of FIG. 1.

FIG. 4 illustrates a flow chart 400 of a method of supporting storage using a multi-writer LFS. In operation, each of objects 101-108 individually performs operations of flow chart 400, in parallel. Operation 402 includes monitoring, or waiting, for incoming data. For example, local object manager 204 waits for incoming data 202. Operation 404 includes receiving incoming data from an object of a plurality of objects, wherein the plurality of objects are configured to simultaneously write to the multi-writer LFS from different physical nodes (e.g., receiving incoming data 202 from object 101). In some examples, the object comprises a VM. In some examples, the object comprises a maintenance process, such as a deduplication process or a segment cleaning process. In some examples, the object comprises a virtualization layer. In some examples, the incoming data comprises an I/O (e.g., a write request). A decision operation 406 includes based at least on receiving the incoming data, determining whether sufficient free segments are available in a local SUT for writing the incoming data, such as determining whether object 101 has been assigned free segment 338, and incoming data will not require any more space than free segment 338. If no free segments had been assigned, and at least one free segment is needed, then there is an insufficient number of free segments available. If one free segment had been assigned, and at least two free segments are needed, then there is an insufficient number of free segments available. In some examples, a reserve amount of free segments is maintained, and if the incoming data will drop the reserve below the reserve amount, then sufficient free segments are not available.

If additional free segments are needed, operation 408 includes, based at least on determining that insufficient free segments are available for writing the incoming data, requesting allocation of new free segments. In some examples, requesting allocation of new free segments comprises requesting allocation of new free segments from the owner of the master SUT. Operation 410 includes allocating, by an owner of a master SUT, new segments for the object, and operation 412 includes indicating the allocation of the new segments in the master SUT. For example, object 101 requests one or more new free segments from compute node 123, because compute node 123 is the master SUT owner. A process on compute node 123 allocates free segments 338 and 338a to object 101, and holds free segment 338b back for allocating to the next writer to request more free segments. The reservation of free segments 338 and 338a is indicated in master SUT 330b, for example by marking them as live. In this manner, allocation of new segments of the first storage is indicated in a master SUT. In some examples, a decision operation 414 includes determining whether the incoming data has accumulated a full segment of data. For example, incoming data 202 may, by itself, comprise more than a full segment of data. If so, some examples may write a full segment's worth of incoming data to a free segment in operation 416, update the local SUT in operation 417, and determine a remainder portion of the incoming data (that is not written as part of operation 416) in operation 418.

Operation 420 includes writing the incoming data to a log. In some examples, writing the incoming data to the log comprises writing the incoming data to a performance tier. For example, incoming data 202 may be written to log 360 on performance tier 144. In some examples, writing the incoming data to the log comprises writing the remainder portion of the incoming data to the log. Operation 422 includes, based at least on writing the incoming data to the log, updating an object map to indicate the writing of the incoming data to the log. For example, object map 362 may be updated as a result of writing accumulated data from log 360 to free segment 338 on capacity tier 146. In various examples, the object map comprises an in-memory B-tree, the object map comprises an LSM-tree, updating the object map comprises mirroring metadata for the object map, mirroring metadata for the object map comprises mirroring metadata for the object map on a performance tier, mirroring metadata for the object map comprises using a three-way mirror, the LFS does not manage mirroring metadata, and/or a logical-to-physical storage map uses an object ID as a major key to prevent overlap of object maps.

Operation 424 includes acknowledging the writing to the object. This way, object 101 does not need to wait for incoming data 202 to be written to capacity tier 146, but can be satisfied that the write is completed after incoming data 202 has been written to log 360. A decision operation 426 includes determining whether the log has accumulated a full segment of data. In some examples, determining whether the log has accumulated a full segment of data comprises determining whether the log has accumulated one or more full segments of data. That is, log 360 may have accumulated enough data, from incoming data 202, plus other I/Os, to fill free segment 338 and perhaps also free segment 338a. If not, flow chart 400 returns to waiting for more data, in operation 402. Otherwise, operation 428 includes, based at least on determining that the log has accumulated a full segment of data, writing the full segment of data to a first segment of the free segments. For example, data from log 360 is written to free segment 338 of the set of free segments 338, 338a, and any other free segments allocated to object 101. In some examples, operation 428 includes, based at least on determining that the log has accumulated multiple full segments of data, writing the multiple full segments of data to two or more segments of the free segments. For example, if log 360 has accumulated enough data, data from log 360 is written to both free segments 338 and 338a. In some examples, writing the full segment of data comprises writing the full segment of data to a capacity tier (e.g., capacity tier 146).

Operation 430 includes, based at least on writing the full segment of data, updating the object map to indicate the writing of the full segment of data. For example, references to incoming data 202 are removed from log 360. Operation 432 includes updating a local SUT to mark the first segment as no longer free. For example, what had been free segment 338 is marked in local SUT 330a as now being a full segment. In some examples, updating the local SUT comprises increasing the number of live blocks indicated for the first segment. In some examples updating the local SUT comprises decreasing the number of available blocks indicated for the first segment (e.g., to zero). At this point, local changes are in-memory in dirty buffers. A dirty buffer is a buffer whose contents have been modified, but not yet written to disk. The contents may be written to disk in batches. A segment cleaning process, for example as performed by flow chart 500 of FIG. 5A, indicates segments that had previously contained live blocks, but which were moved to new segments. In some examples, the merging of local SUT 330a into master SUT 330b includes not only segments which have been written to (e.g., free segment 338, which is now occupied), but also segments that have been identified as free or now full according to a segment cleaning process.

A decision operation 434 includes determining whether a merge trigger condition has occurred. For example, a merge trigger may be a threshold amount of changes to local SUT 330a, which prompts a SUT merge into master SUT 330b, or may be a timer event indicating a maximum wait time. Merges may wait until a trigger condition, and are not needed immediately, because free segments had already been deconflicted. That is, each writer writes to only its own allocated segments. Thus, multiple writers can write from different physical nodes to the same LFS, without frequent communication with each other, because they each write to their own free space by having their own local SUT. If there is no merge trigger condition, flow chart 400 returns to operation 402. Otherwise, operation 436 includes merging local SUT updates into the master SUT. In some examples, merging local SUT updates into the master SUT comprises, based at least on determining that the merge trigger condition has occurred, merging local SUT updates into the master SUT.

Figure 5A:
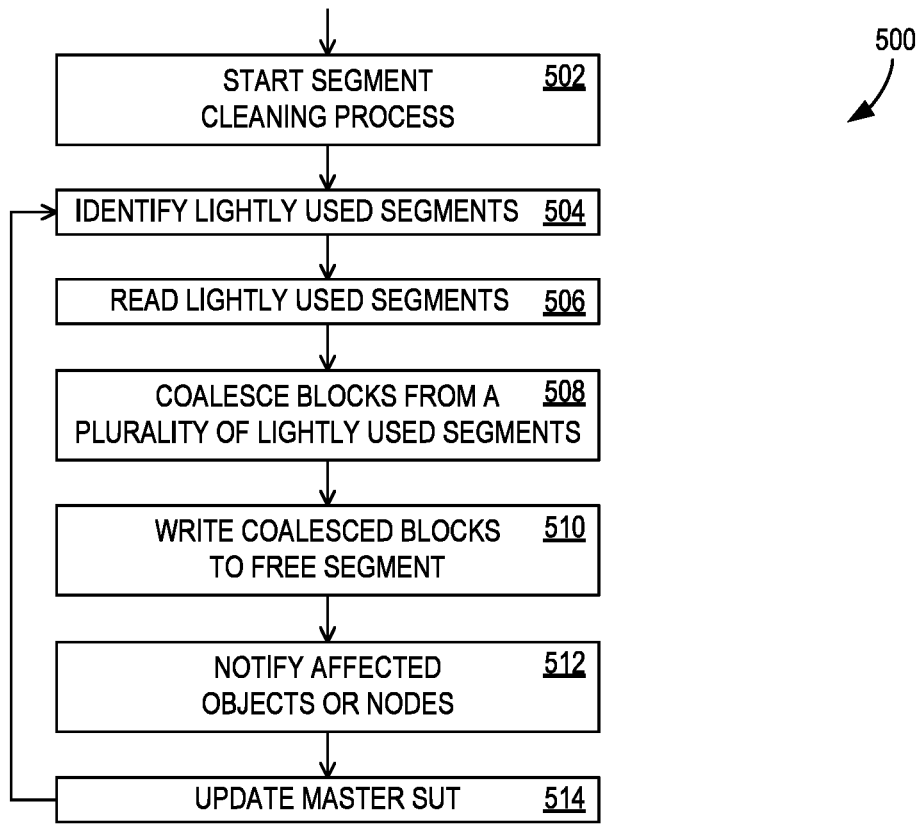
FIGS. 5A-5C illustrate flow charts of additional exemplary operations that may be used in conjunction with the flow chart of FIG. 4.

FIG. 5A illustrates a flow chart 500 of a segment cleaning process that may be used in conjunction with flow chart 400. A segment cleaning process is used to create free space, for example entire segments, for new writes. Aspects of the disclosure are able to perform multiple segment cleaning processes in parallel to free segments. In some examples, a segment cleaning process may operate for each local SUT. Segment cleaning processes may repeat upon multiple trigger conditions, such as a periodic time (e.g., every 30 seconds), when a compute node or object is idle, or when free space drop below a threshold. In some examples, the master SUT owner kicks off a segment cleaning process, spawning a logical segment cleaning worker that is a writer (object).

Operation 502 starts a segment cleaning process, and for some examples, if a segment cleaning process is started for multiple objects, operation 502 comprises performing multiple segment cleaning processes in parallel to free segments. Operation 504 identifies lightly used segments (e.g., segments 342a, 342b, and 342c), and these lightly used segments are read in operation 506. Operation 508 coalesces live blocks from a plurality of lightly used segments in an attempt to reach at least an entire segment's worth of data. Operation 510 writes the coalesced blocks back to storage as a full segment, but using a fewer number of segments (e.g., a single full segment) than the number of lightly used segments from which the blocks had been coalesced in operation 508. The prior-used blocks, from which the coalesced blocks were read, are marked as free for overwriting with new data, later.

Operation 512 includes notifying at least affected nodes of block movements resulting from the segment cleaning processes. For example, notification is delivered to operation 432 of flow chart 400. This enables local SUTs to be updated. Operation 514 includes updating the master SUT to indicate that the formerly lightly-used segments are now free segments, which can be assigned for further writing operations. In some examples, this occurs as part of operation 436 of flow chart 400. The segment cleaning process may then loop back to operation 504 or terminate.

Figure 5B:
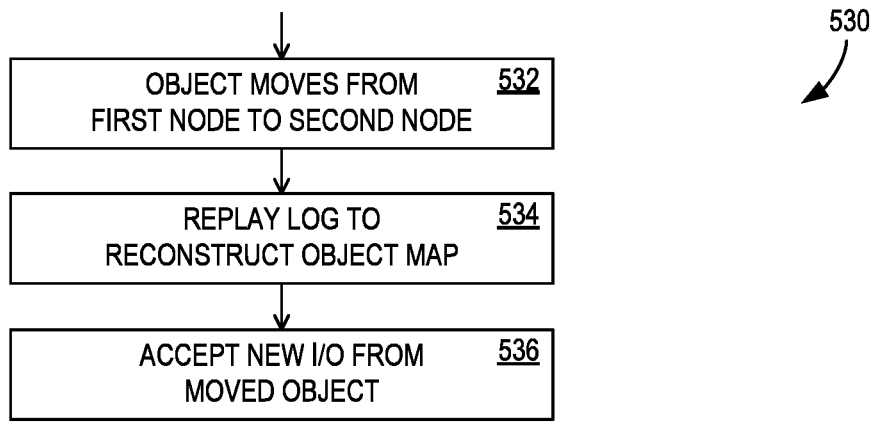

FIG. 5B illustrates a flow chart 530 of moving an object from a first compute node to a second (new) compute node, for example moving object 101 from compute node 121 to compute node 122. In operation 532 an object moves to a new compute node. Operation 534 includes, based at least on the object moving to a new node, prior to accepting new incoming data from the object, replaying the log to reconstruct a new object map. Operation 536 includes accept new incoming data from moved object. When an object (e.g., a VMDK) moves from one compute node to another compute node it first replays its part of the data log (e.g., log 360) from its original node to reconstruct the mapping table state for the new node before accepting new I/Os.

Figure 5C:
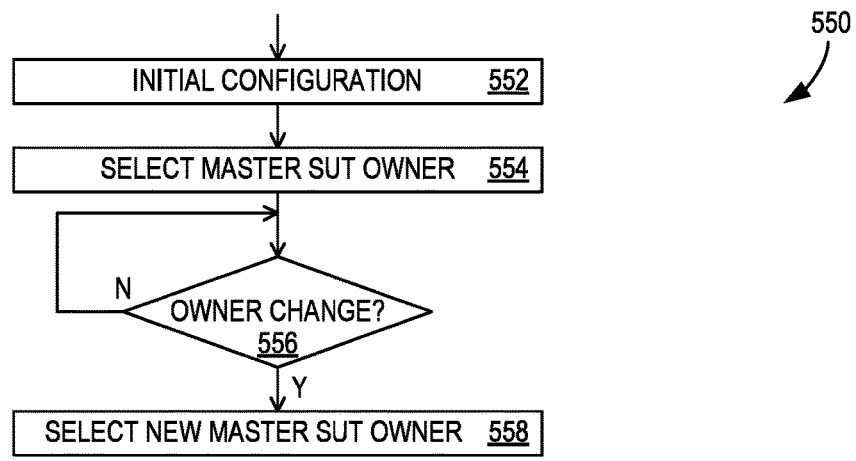

FIG. 5C illustrates a flow chart 550 of selecting a master SUT owner. Operation 552 is the initial configuration, such as may occur with a boot and start-up process. Operation 554 includes selecting the owner of the master SUT (e.g., the master SUT owner). In FIG. 2, the master SUT owner is compute node 123. In some examples, selecting the owner of the master SUT comprises using a consensus mechanism. In some situations, the master SUT owner will need to change, for example, if the master SUT owner ceases to operate properly. Such a condition may be a master SUT change trigger condition. Other master SUT change trigger conditions may also exist. Operation 556 includes determining whether a master SUT change trigger condition has occurred. If not, operation 556 may continue waiting. However, if a master SUT change trigger condition has occurred, operation 558 includes, based at least on determining that the master SUT change trigger condition has occurred, selecting a new owner of the master SUT. In some examples, selecting the new owner of the master SUT comprises using a consensus mechanism (e.g., the same selection scheme as was used in the initial selection of operation 554).

Figure 6:
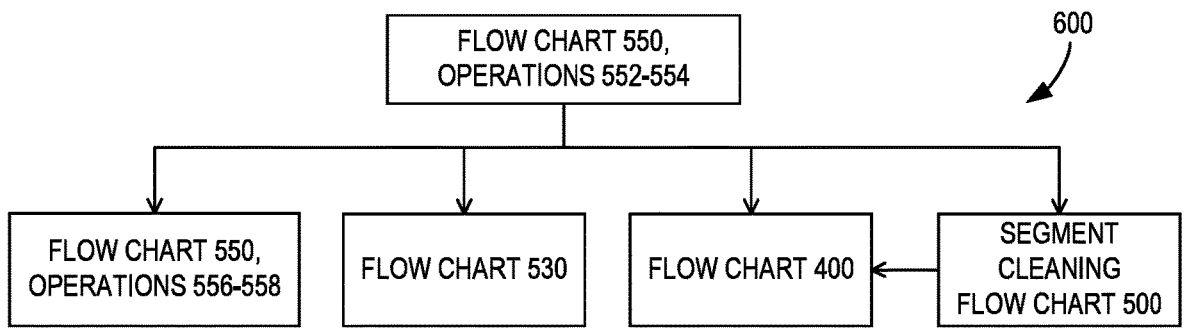
FIG. 6 illustrates another flow chart showing exemplary relationships among the flow charts of FIGS. 4-5C.

FIG. 6 illustrates a flow chart 600 showing exemplary relationships among the flow charts of FIGS. 4-5C. In some examples, the operations of flow charts 400-600 are performed by one or more computing devices 800 of FIG. 8. Although flow charts 400-600 are illustrated for simplicity as a linear workflow, one or more of the operations represented by flow charts 400-600 may be asynchronous. As indicated, operations 552-554 of flow chart 550 (of FIG. 5C) are used for initialization, and operations 552-554 of flow chart 550 may be concurrent with the operations of flow chart 530 (of FIG. 5B), flow chart 500 (of FIG. 5A), and flow chart 400 (of FIG. 4). As described previously, operation 514 of flow chart 500 provides input to operation 432 of flow chart 400.

Figure 7:
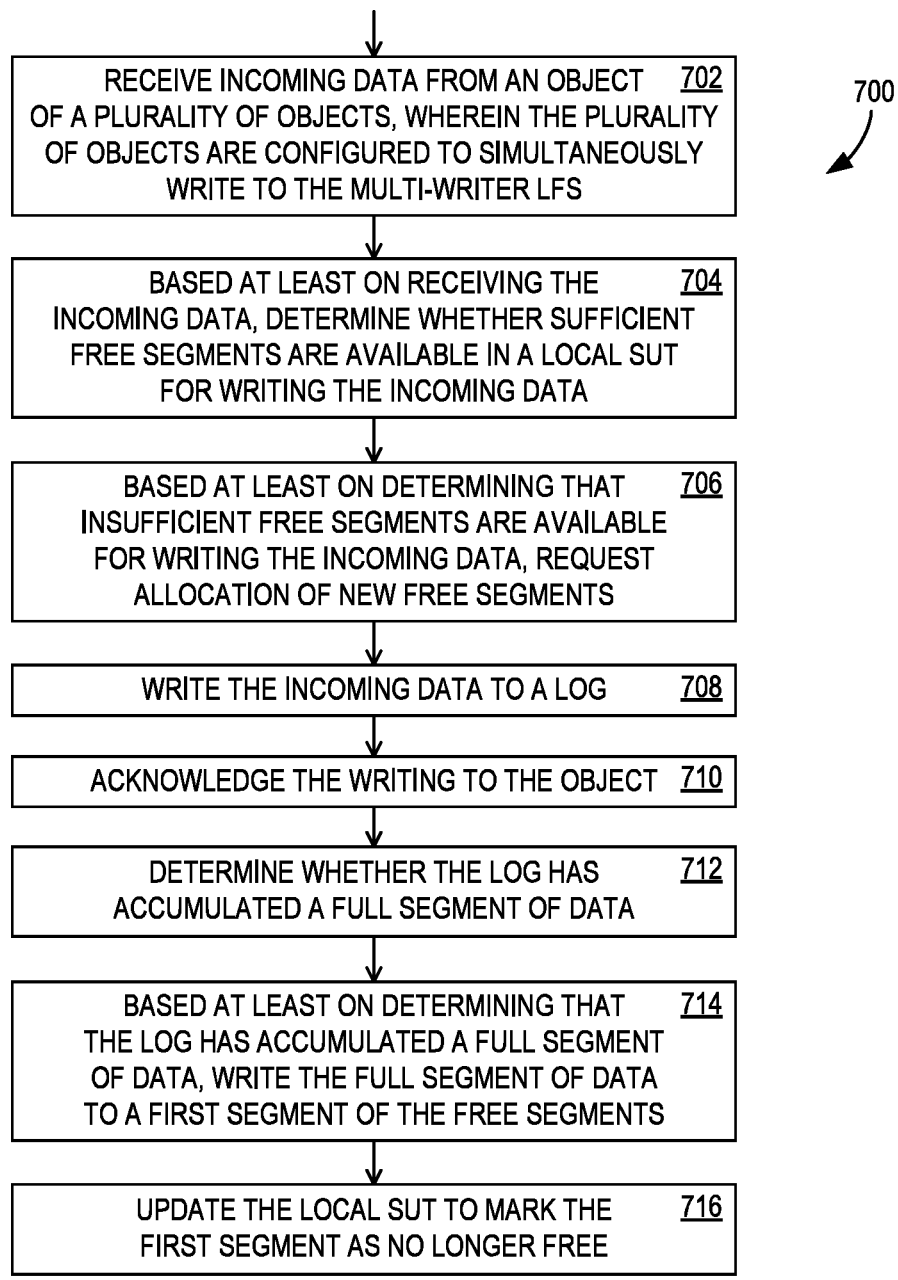
FIG. 7 illustrates another flow chart of exemplary operations associated with the architecture of FIG. 1.

FIG. 7 illustrates a flow chart 700 showing a method of supporting storage using a multi-writer LFS. In some examples, the operations of flow chart 700 are performed by one or more computing devices 800 of FIG. 8. Operation 702 includes receiving incoming data from an object of a plurality of objects, wherein the plurality of objects are configured to simultaneously write to the multi-writer LFS from different physical nodes. Operation 704 includes, based at least on receiving the incoming data, determining whether sufficient free segments are available in a local SUT for writing the incoming data. Operation 706 includes, based at least on determining that insufficient free segments are available for writing the incoming data, requesting allocation of new free segments. Operation 708 includes writing the incoming data to a log. Operation 710 includes acknowledging the writing to the object. Operation 712 includes determining whether the log has accumulated a full segment of data. Operation 714 includes, based at least on determining that the log has accumulated a full segment of data, writing the full segment of data to a first segment of the free segments. Operation 716 includes updating a local SUT to mark the first segment as no longer free.

Figure 8:
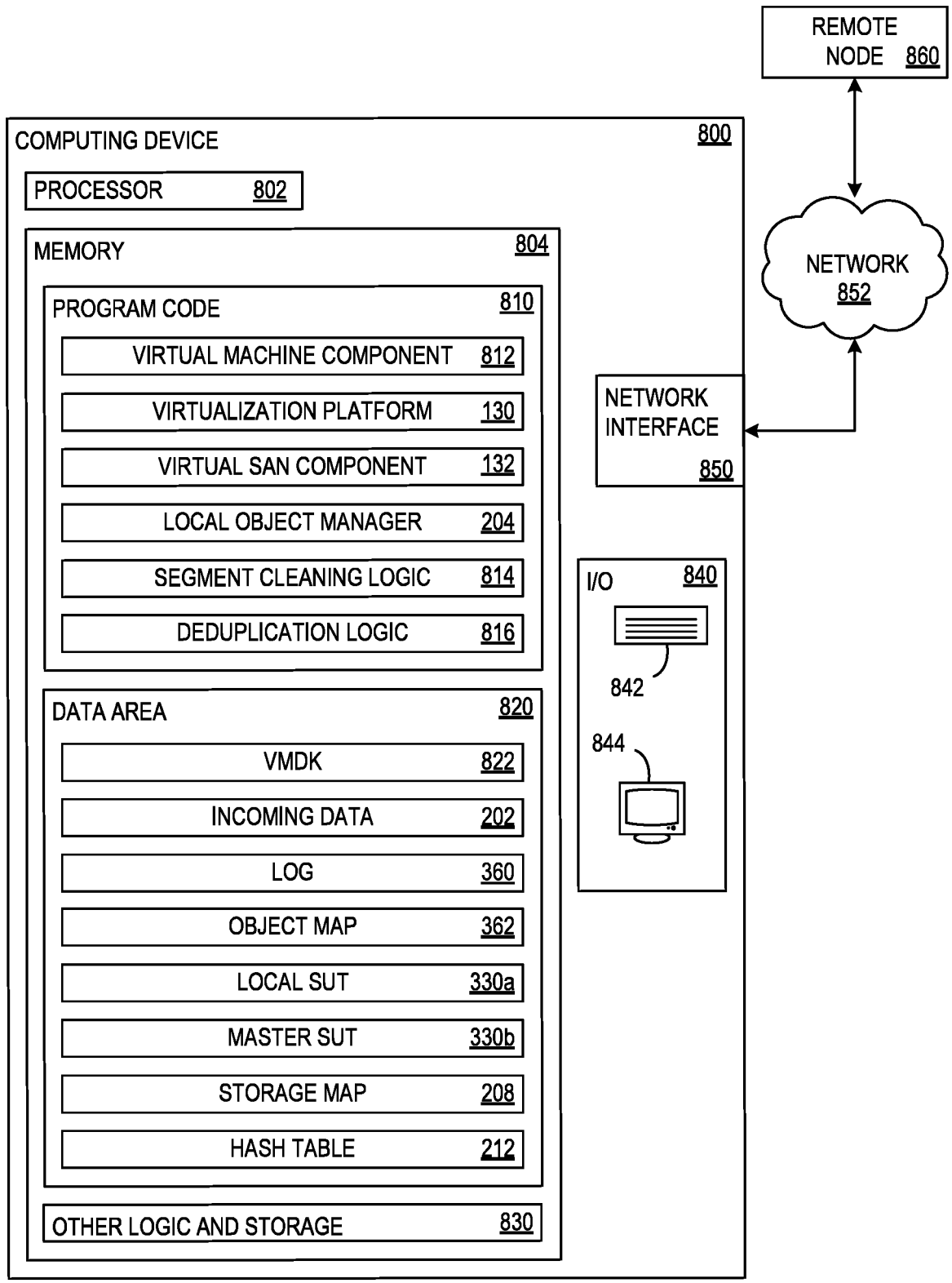
FIG. 8 illustrates a block diagram of a computing device that may be used as a component of the architecture of FIG. 1, according to an example embodiment.

FIG. 8 illustrates a block diagram of computing device 800 that may be used within architecture 100 of FIG. 1. Computing device 800 has at least a processor 802 and a memory 804 (or memory area) that holds program code 810, data area 820, and other logic and storage 830. Memory 804 is any device allowing information, such as computer executable instructions and/or other data, to be stored and retrieved. For example, memory 804 may include one or more random access memory (RAM) modules, flash memory modules, hard disks, solid-state disks, NVMe devices, Persistent Memory devices, and/or optical disks. Program code 810 comprises computer executable instructions and computer executable components including any of virtual machine component 812, virtualization platform 130, virtual SAN component 132, local object manager 204, segment cleaning logic 814, and deduplication logic 816. Virtual machine component 812 generates and manages objects, for example objects 101-108. Segment cleaning logic 814 and/or deduplication logic 816 may represent various manifestations of maintenance processes 210a and 210b.

Data area 820 holds any of VMDK 822, incoming data 202, log 360, object map 362, local SUT 330a, master SUT 330b, storage map 208, and hash table 212. VMDK 822 represents any of VMDKs 111-118. Memory 804 also includes other logic and storage 830 that performs or facilitates other functions disclosed herein or otherwise required of computing device 800. A keyboard 842 and a computer monitor 844 are illustrated as exemplary portions of I/O component 840, which may also or instead include a touchscreen, mouse, trackpad, and/or other I/O devices. A network interface 850 permits communication over a network 852 with a remote node 860, which may represent another implementation of computing device 800, a cloud service. For example, remote node 860 may represent any of compute nodes 121-123 and storage nodes 141-143.

Computing device 800 generally represents any device executing instructions (e.g., as application programs, operating system functionality, or both) to implement the operations and functionality described herein. Computing device 800 may include any portable or non-portable device including a mobile telephone, laptop, tablet, computing pad, netbook, gaming device, portable medium player, desktop personal computer, kiosk, embedded device, and/or tabletop device. Additionally, computing device 800 may represent a group of processing units or other computing devices, such as in a cloud computing system or service. Processor 802 may include any quantity of processing units and may be programmed to execute any components of program code 810 comprising computer executable instructions for implementing aspects of the disclosure. In some embodiments, processor 802 is programmed to execute instructions such as those illustrated in the figures.

Additional Examples

An example computer system for supporting storage using a multi-writer LFS comprises: a processor; and a non-transitory computer readable medium having stored thereon program code for transferring data to another computer system, the program code causing the processor to: receive incoming data from an object of a plurality of objects, wherein the plurality of objects are configured to simultaneously write to the multi-writer LFS from different physical nodes; based at least on receiving the incoming data, determine whether sufficient free segments are available in a local SUT for writing the incoming data; based at least on determining that insufficient free segments are available for writing the incoming data, request allocation of new free segments; write the incoming data to a log; acknowledge the writing to the object; determine whether the log has accumulated a full segment of data; based at least on determining that the log has accumulated a full segment of data, write the full segment of data to a first segment of the free segments; and update the local SUT to mark the first segment as no longer free.

An exemplary method of supporting storage using a multi-writer LFS comprises: receiving incoming data from an object of a plurality of objects, wherein the plurality of objects are configured to simultaneously write to the multi-writer LFS from different physical nodes; based at least on receiving the incoming data, determining whether sufficient free segments are available in a local SUT for writing the incoming data; based at least on determining that insufficient free segments are available for writing the incoming data, requesting allocation of new free segments; writing the incoming data to a log; acknowledging the writing to the object; determining whether the log has accumulated a full segment of data; based at least on determining that the log has accumulated a full segment of data, writing the full segment of data to a first segment of the free segments; and updating the local SUT to mark the first segment as no longer free.

One or more exemplary non-transitory computer storage medium have computer-executable instructions that, upon execution by a processor, cause the processor to at least perform operations that comprise: receiving incoming data from an object of a plurality of objects, wherein the plurality of objects are configured to simultaneously write to the multi-writer LFS from different physical nodes; based at least on receiving the incoming data, determining whether sufficient free segments are available in a local SUT for writing the incoming data; based at least on determining that insufficient free segments are available for writing the incoming data, requesting allocation of new free segments; writing the incoming data to a log; acknowledging the writing to the object; determining whether the log has accumulated a full segment of data; based at least on determining that the log has accumulated a full segment of data, writing the full segment of data to a first segment of the free segments; and updating the local SUT to mark the first segment as no longer free.

Alternatively, or in addition to the other examples described herein, examples include any combination of the following:

the object comprises a VM;
based at least on receiving the incoming data, determining whether sufficient free segments are available in a local SUT for writing the incoming data;
writing the incoming data to the log comprises writing the incoming data to a performance tier;
writing the full segment of data comprises writing the full segment of data to a capacity tier;
based at least on writing the incoming data to the log, updating an object map to indicate the writing of the incoming data to the log;
the object map comprises an in-memory B-tree;
the object map comprises an LSM-tree;
updating the object map comprises mirroring metadata for the object map;
mirroring metadata for the object map comprises mirroring metadata for the object map on a performance tier;
mirroring metadata for the object map comprises using a three-way mirror;
the LFS does not manage mirroring metadata;
a logical-to-physical storage map uses an object ID as a major key, thereby preventing overlap of object maps;
based at least on writing the full segment of data, updating the object map to indicate the writing of the full segment of data;
determining whether the log has accumulated a full segment of data comprises determining whether the log has accumulated one or more full segments of data;
based at least on determining that the log has accumulated multiple full segments of data, writing the multiple full segments of data to two or more segments of the free segments;
updating the local SUT comprises decreasing the number of available blocks indicated for the first segment;
updating the local SUT comprises increasing the number of live blocks indicated for the first segment;
selecting an owner of a master SUT;
selecting the owner of the master SUT comprises using a consensus mechanism;
requesting allocation of new free segments comprises requesting allocation of new free segments from the owner of the master SUT;
allocating, by an owner of a master SUT, new segments for the object;
allocation of new segments of the first storage is indicated in the master SUT;
merging local SUT updates into the master SUT;
determining whether a master SUT change trigger condition has occurred;
based at least on determining that the master SUT change trigger condition has occurred, selecting a new owner of the master SUT;
determining whether a merge trigger condition has occurred;
merging local SUT updates into the master SUT comprises, based at least on determining that the merge trigger condition has occurred, merging local SUT updates into the master SUT;
based at least on the object moving to a new node, prior to accepting new incoming data from the object, replaying the log to reconstruct a new object map;
performing multiple segment cleaning processes in parallel to free segments; and
notifying at least affected nodes of block movements resulting from the segment cleaning processes.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, NVMe devices, persistent memory devices, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of supporting storage using a multi-writer log-structured file system (LFS), the method comprising:
    receiving incoming data from an object of a plurality of objects, wherein the plurality of objects is configured to simultaneously write to the multi-writer LFS from different physical nodes, wherein each of the plurality of objects uses its own local segment usage table (SUT), that is assigned its own set of free space, for simultaneously writing, without collision, to the multi-writer LFS;
    upon receiving the incoming data, determining whether sufficient free segments are available, using a local SUT of the object assigned its own set of free space, for writing the incoming data;
    upon determining that insufficient free segments are available for writing the incoming data, requesting allocation of one or more free segments to the object;
    writing the incoming data to a log of the multi-writer LFS;
    acknowledging the writing to the object;
    determining whether the log has accumulated a full segment of data;
    upon determining that the log has accumulated the full segment of data, writing the full segment of data to a first segment of the one or more free segments; and updating the local SUT to mark the first segment as no longer free.

2. The method of claim 1, wherein writing the incoming data to the log comprises writing the incoming data to a performance tier and wherein writing the full segment of data comprises writing the full segment of data to a capacity tier.

3. The method of claim 1, further comprising:
based at least on writing the incoming data to the log, updating an object map to indicate the writing of the incoming data to the log, wherein a logical-to-physical storage map uses an object ID as a major key to prevent overlap of object maps; and
based at least on writing the full segment of data, updating the object map to indicate the writing of the full segment of data.

4. The method of claim 1, further comprising:
determining whether a merge trigger condition has occurred; and
upon determining that the merge trigger condition has occurred, merging the local SUT updates into a master SUT.

5. The method of claim 1, further comprising:
selecting an owner of a master SUT, wherein requesting allocation of the one or more free segments comprises requesting allocation of the one or more free segments from the owner of the master SUT;
determining whether a master SUT change trigger condition has occurred; and
upon determining that the master SUT change trigger condition has occurred, selecting a new owner of the master SUT.

6. The method of claim 1, further comprising:
based at least on the object moving to a new node, prior to accepting new incoming data from the object, replaying the log to reconstruct a new object map for the new node.

7. The method of claim 1, further comprising:
performing multiple segment cleaning processes in parallel to free segments; and
notifying at least affected nodes of block movements resulting from the segment cleaning processes.

8. A computer system for supporting storage using a multi-writer log-structured file system (LFS), the computer system comprising:
a processor; and
a non-transitory computer readable medium having stored thereon program code for transferring data to another computer system, the program code causing the processor to:
receive incoming data from an object of a plurality of objects, wherein the plurality of objects is configured to simultaneously write to the multi-writer LFS from different physical nodes, wherein each of the plurality of objects uses its own local segment usage table (SUT), that is assigned its own set of free space, for simultaneously writing, without collision, to the multi-writer LFS;
upon receiving the incoming data, determine whether sufficient free segments are available, using a local SUT of the object assigned its own set of free space, for writing the incoming data;
upon determining that insufficient free segments are available for writing the incoming data, request allocation of one or more free segments to the object;
write the incoming data to a log;
acknowledge the writing to the object;
determine whether the log has accumulated a full segment of data;
upon determining that the log has accumulated the full segment of data, write the full segment of data to a first segment of the one or more free segments; and
update the local SUT to mark the first segment as no longer free.

9. The computer system of claim 8, wherein writing the incoming data to the log comprises writing the incoming data to a performance tier and wherein writing the full segment of data comprises writing the full segment of data to a capacity tier.

10. The computer system of claim 8, wherein the program code is further operative to:
based at least on writing the incoming data to the log, update an object map to indicate the writing of the incoming data to the log, wherein a logical-to-physical storage map uses an object ID as a major key to prevent overlap of object maps; and
based at least on writing the full segment of data, update the object map to indicate the writing of the full segment of data.

11. The computer system of claim 8, wherein the program code is further operative to:
determine whether a merge trigger condition has occurred; and
upon determining that the merge trigger condition has occurred, merge the local SUT updates into a master SUT.

12. The computer system of claim 8, wherein the program code is further operative to:
select an owner of a master SUT, wherein requesting allocation of the one or more free segments comprises requesting allocation of the one or more free segments from the owner of the master SUT;
determine whether a master SUT change trigger condition has occurred; and
upon determining that the master SUT change trigger condition has occurred, select a new owner of the master SUT.

13. The computer system of claim 8, wherein the program code is further operative to:
based at least on the object moving to a new node, prior to accepting new incoming data from the object, replaying the log to reconstruct a new object map for the new node.

14. The computer system of claim 8, wherein the program code is further operative to:
perform multiple segment cleaning processes in parallel to free segments; and
notify at least affected nodes of block movements resulting from the segment cleaning processes.

15. A non-transitory computer storage medium having stored thereon program code executable by a first computer system at a first site, the program code embodying a method comprising:
receiving incoming data from an object of a plurality of objects, wherein the plurality of objects is configured to simultaneously write to the multi-writer LFS from different physical nodes, wherein each of the plurality of objects uses its own local segment usage table (SUT), that is assigned its own set of free space, for simultaneously writing, without collision, to the multi-writer LFS;

upon receiving the incoming data, determining whether sufficient free segments are available, using a local SUT of the object assigned its own set of free space, for writing the incoming data;

upon determining that insufficient free segments are available for writing the incoming data, requesting allocation of one or more free segments to the object;

writing the incoming data to a log;

acknowledging the writing to the object;

determining whether the log has accumulated a full segment of data;

upon determining that the log has accumulated the full segment of data, writing the full segment of data to a first segment of the one or more free segments; and updating the local SUT to mark the first segment as no longer free.

16. The non-transitory computer storage medium of claim 15, wherein writing the incoming data to the log comprises writing the incoming data to a performance tier and wherein writing the full segment of data comprises writing the full segment of data to a capacity tier.

17. The non-transitory computer storage medium of claim 15, wherein the program code further comprises:

based at least on writing the incoming data to the log, updating an object map to indicate the writing of the incoming data to the log, wherein a logical-to-physical storage map uses an object ID as a major key to prevent overlap of object maps; and based at least on writing the full segment of data, updating the object map to indicate the writing of the full segment of data.

18. The non-transitory computer storage medium of claim 15, wherein the program code further comprises:

determining whether a merge trigger condition has occurred; and upon determining that the merge trigger condition has occurred, merging the local SUT updates into a master SUT.

19. The non-transitory computer storage medium of claim 15, wherein the program code further comprises:

selecting an owner of a master SUT, wherein requesting allocation of the one or more free segments comprises requesting allocation of the one or more free segments from the owner of the master SUT;

determining whether a master SUT change trigger condition has occurred;

upon determining that the master SUT change trigger condition has occurred, selecting a new owner of the master SUT; and based at least on the object moving to a new node, prior to accepting new incoming data from the object, replaying the log to reconstruct a new object map for the new node.

20. The non-transitory computer storage medium of claim 15, wherein the program code further comprises:

performing multiple segment cleaning processes in parallel to free segments; and notifying at least affected nodes of block movements resulting from the segment cleaning processes.

* * * * *